US012687211B2

(12) United States Patent
Luczak et al.

(10) Patent No.: US 12,687,211 B2
(45) Date of Patent: Jul. 21, 2026

(54) VIBRATION DAMPER

(71) Applicants: thyssenkrupp Bilstein GmbH,
Ennepetal (DE); thyssenkrupp AG,
Essen (DE)

(72) Inventors: Hanno Luczak, Hattingen (DE);
Carsten Fox, Dortmund (DE);
Christoph Niggemeyer, Bochum (DE);
Tobias Bergmann, Dortmund (DE);
Dennis Spranger, Bottrop (DE)

(73) Assignees: thyssenkrupp Bilstein GmbH,
Ennepetal (DE); thyssenkrupp AG,
Essen (DE)

( * ) Notice: Subject to any disclaimer, the term of this
patent is extended or adjusted under 35
U.S.C. 154(b) by 383 days.

(21) Appl. No.: 18/243,447

(22) Filed: Sep. 7, 2023

(65) Prior Publication Data

US 2024/0077125 A1 Mar. 7, 2024

(30) Foreign Application Priority Data

Sep. 7, 2022 (DE) .................... 10 2022 209 324.0

(51) Int. Cl.
*F16F 9/18* (2006.01)
*F16F 9/32* (2006.01)
(Continued)

(52) U.S. Cl.
CPC ................ *F16F 9/18* (2013.01); *F16F 9/325*
(2013.01); *F16F 9/369* (2013.01); *F16F 9/50*
(2013.01);
(Continued)

(58) Field of Classification Search
CPC ...... F16F 9/18; F16F 9/50; F16F 9/585; F16F
9/369; F16F 9/49; F16F 9/364; F16F
9/3257; F16F 9/325
See application file for complete search history.

(56) References Cited

U.S. PATENT DOCUMENTS 2,522,323 A * 9/1950 Whisler, Jr. .............. F16F 9/36
277/584
6,464,048 B1 * 10/2002 Groves ................... F16F 9/465
188/315

(Continued)

FOREIGN PATENT DOCUMENTS

DE 10 2005 053 394 A1 5/2006
DE 10 2005 060 955 A1 1/2007
(Continued)

*Primary Examiner* — Nicholas J Lane
(74) *Attorney, Agent, or Firm* — thyssenkrupp North
America, LLC

(57) ABSTRACT

The present disclosure relates to a vibration damper with
adjustable damping force, comprising an inner cylinder with
at least one working chamber which exhibits a flow con-
nection to a damping-valve device, wherein the damper-
valve device is arranged outside of an outer cylinder,
wherein the flow connection has been realized in a compo-
nent that is separate from the inner cylinder, wherein the
separate component is constituted by a pressure-stage
adapter which constitutes a part of the working chamber and
which exhibits a coupling to the damping-valve device,
wherein a base piece is arranged at the end of the inner
cylinder, wherein the pressure-stage adapter and the base
piece have been combined to form a pressure-stage adapter
device.

12 Claims, 3 Drawing Sheets

(51) Int. Cl.

| | |
|---|---|
| *F16F 9/36* | (2006.01) |
| *F16F 9/50* | (2006.01) |
| *F16F 9/58* | (2006.01) |
| *B60G 13/08* | (2006.01) |
| *B60G 17/08* | (2006.01) |

(52) U.S. Cl.

CPC .............. *F16F 9/585* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2500/11* (2013.01); *B60G 2800/162* (2013.01); *B60G 2800/916* (2013.01); *F16F 2222/12* (2013.01); *F16F 2228/066* (2013.01); *F16F 2230/30* (2013.01); *F16F 2232/08* (2013.01); *F16F 2234/02* (2013.01)

(56) References Cited

U.S. PATENT DOCUMENTS

| | | | | |
|---|---|---|---|---|
| 8,511,447 | B2 * | 8/2013 | Nowaczyk .............. | F16F 9/325 188/315 |
| 9,091,320 | B1 * | 7/2015 | Smith ....................... | F16F 9/22 |
| 9,279,470 | B2 * | 3/2016 | Ikeda ..................... | B62K 25/08 |
| 10,145,438 | B2 * | 12/2018 | Uotani ..................... | F16F 9/34 |
| 11,649,873 | B1 * | 5/2023 | Smith ..................... | F16F 9/446 188/314 |
| 11,781,611 | B2 * | 10/2023 | Iriondo .................. | F16F 9/369 188/281 |
| 2007/0000743 | A1 | 1/2007 | Naitou et al. | |
| 2016/0288870 | A1 * | 10/2016 | Murakami .............. | F16F 9/465 |
| 2018/0355940 | A1 | 12/2018 | Manger et al. | |
| 2020/0173513 | A1 * | 6/2020 | Woenarta ............... | F16F 9/067 |
| 2021/0164533 | A1 * | 6/2021 | Zeissner .................. | F16F 9/32 |
| 2022/0316546 | A1 * | 10/2022 | Schmitt .................. | F16F 9/46 |
| 2024/0084874 | A1 * | 3/2024 | Regner ................. | B60G 17/06 |

FOREIGN PATENT DOCUMENTS

| | | | |
|---|---|---|---|
| DE | 10 2010 045 076 | B3 | 1/2012 |
| DE | 10 2017 209 609 | A1 | 12/2018 |
| DE | 10 2017 222 232 | A1 | 6/2019 |
| DE | 10 2019 206 455 | A1 | 11/2020 |
| DE | 10 2020 008 116 | A1 | 2/2022 |

* cited by examiner

Fig, 2a
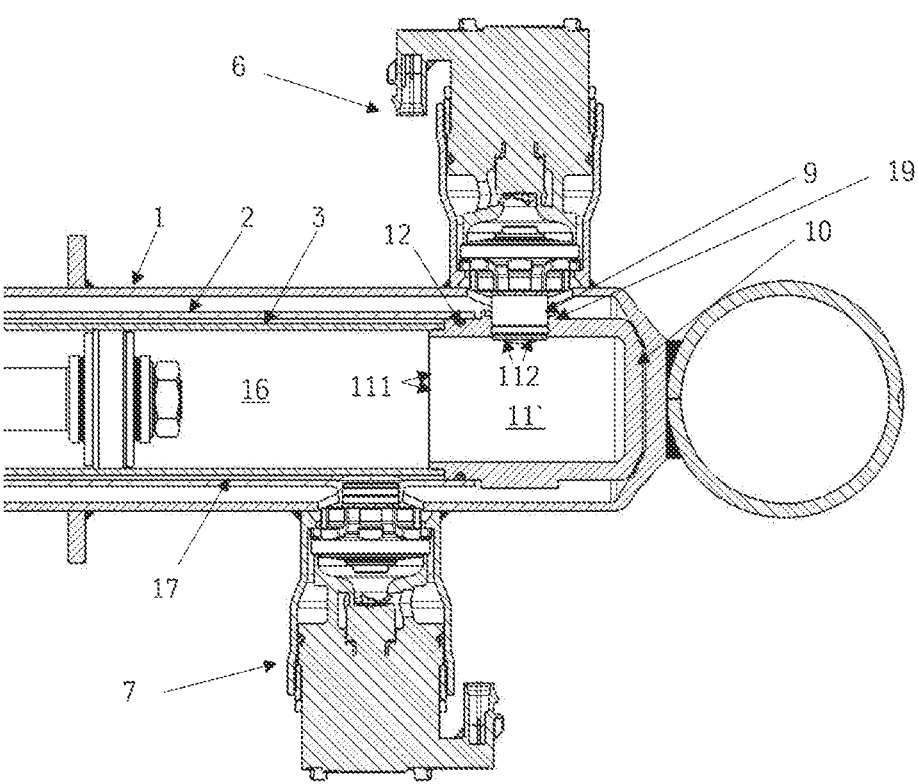
Fig, 3
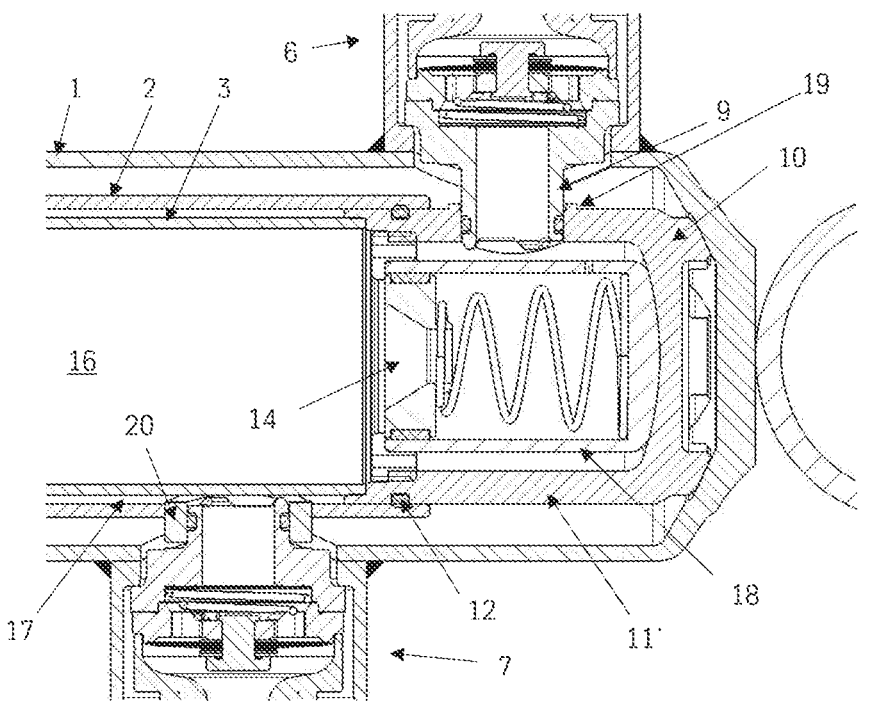

VIBRATION DAMPER

CROSS REFERENCE TO RELATED APPLICATION

This application is a U.S. Non-Provisional that claims priority to German Patent Application No. DE 10 2022 209 324.0, filed Sep. 7, 2022, and the entire content of which is incorporated herein by reference.

FIELD

The disclosure generally relates to a vibration damper and more specifically to a vibration-damper with adjustable damping force.

BACKGROUND

A vibration damper has become known from DE 10 2017 222 232 A1, for instance. In the cited patent specification, a vibration damper with adjustable damping force is described, comprising an inner cylinder with a working chamber which exhibits a flow connection to a damping-valve device which is arranged outside of an outer cylinder, the flow connection having been realized in a component that is separate from the inner cylinder. The vibration damper is distinguished, in particular, in that the separate component is constituted by an adapter sleeve which constitutes a part of the working chamber and which exhibits a connecting piece leading to the damping-valve device.

Even though a usable vibration damper is already proposed in the cited patent specification, there is nevertheless a need for improvement, particularly with regard to simplification and ease of installation.

Thus a need exists for an improved vibration damper, in particular a simplified vibration damper that is easier to install.

BRIEF DESCRIPTION OF THE FIGURES

Further advantageous details, features and details of the disclosure will be explained in more detail in the context of the exemplary embodiments illustrated in the figures, in which:

FIG. 2a shows details of a vibration-damper according to the disclosure.

FIG. 3 shows details of a vibration-damper according to the disclosure.

DETAILED DESCRIPTION

Figure 1:
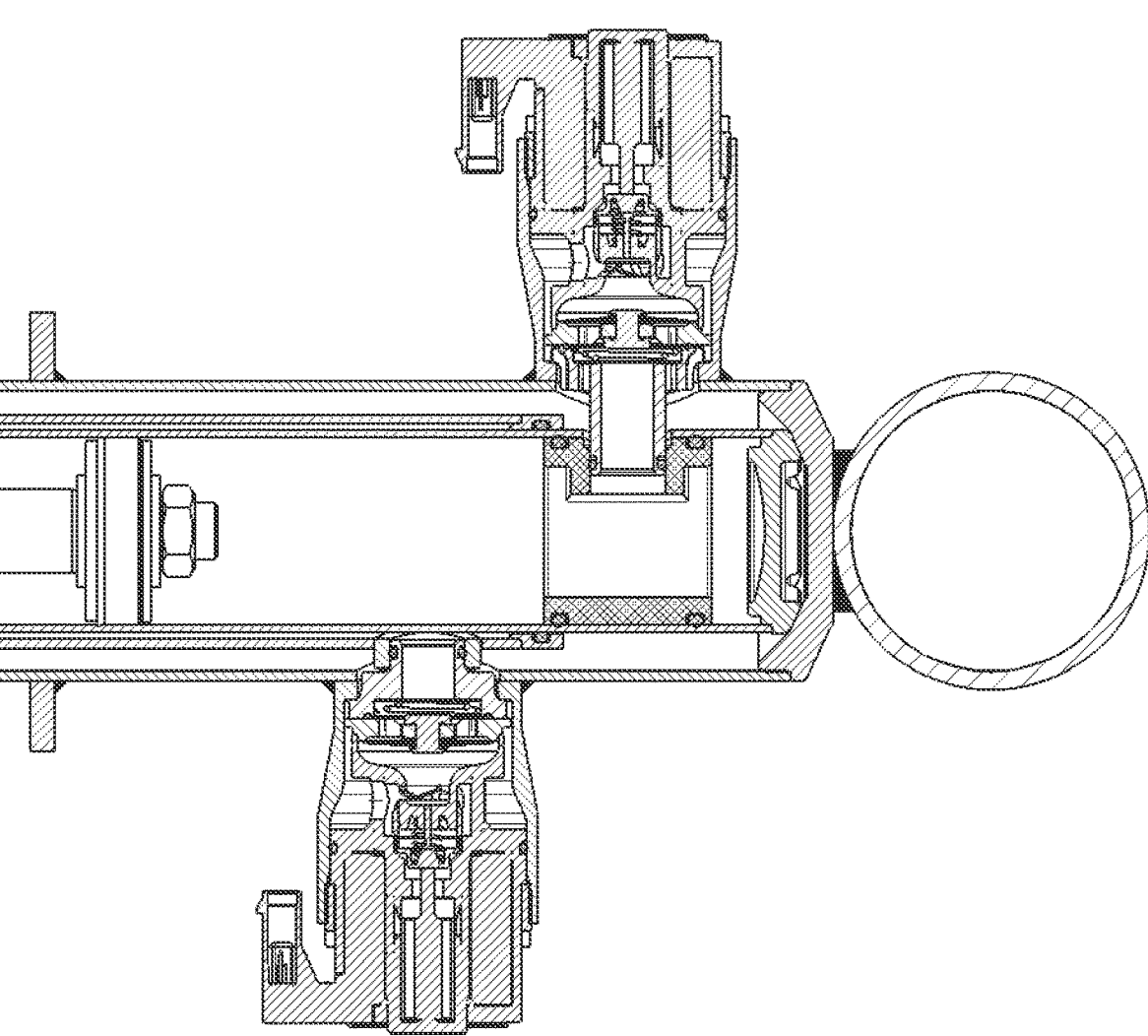
FIG. 1 shows details of a vibration-damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

By virtue of the measure that the pressure-stage adapter and the base piece have been combined to form a pressure-stage adapter device, an improved vibration-damper can be made available, in particular, a simplified vibration-damper that is easier to install can be made available. The pressure-stage adapter device is distinguished, in particular, by its one-piece design. Further sealing-points can, in principle, also be avoided.

In an advantageous configuration of the disclosure, there may be provision that the pressure-stage adapter device includes a seal. Also by this means, a further functional element can be integrated into the pressure-stage adapter device.

In another advantageous configuration of the disclosure, there may be provision that an intermediate pipe has been provided which encases the inner cylinder at least in sections and protrudes beyond the inner cylinder, the seal being arranged between the pressure-stage adapter and the intermediate pipe. The seal integrated into the pressure-stage adapter device can be placed against the respective sealing-point upon insertion of the pressure-stage adapter device. In principle, there may also be provision that the seal, or even a further seal, has been arranged in such a manner that it enters into contact with the inner cylinder and displays its sealing effect there.

In another advantageous configuration of the disclosure, there may be provision that the inner cylinder does not exhibit an inner-pipe through-bore for coupling the first damper-valve device. Rather, the pressure-stage adapter device offers a coupling option, namely that the pressure-stage adapter device can be coupled directly to the damper-valve arrangement without a through-bore, for instance, being needed in the inner pipe.

In another advantageous configuration of the disclosure, there may be provision that a pressure-stop damping element has been additionally integrated into the pressure-stage adapter device. In this case, it is a question of another advantageous functional element that can be integrated into the pressure-stage adapter device.

In another advantageous configuration of the disclosure, the pressure-stop damping element consists of a sleeve, which has been integrated within the pressure-stage adapter device, and an additional piston which is spring-loaded at the end of the sleeve close to the piston rod. By this means, an increased damping force can be obtained upon intrusion of the piston rod into the end region of the cylinder.

In another advantageous configuration of the disclosure, there may be provision that the pressure-stage adapter device includes a connecting pin for accommodating a flange of one of the damping-valve devices.

In another advantageous configuration of the disclosure, there may be provision that the pressure-stop damping element has been attached—in particular, has been clamped or screw-coupled—to the diameter—in particular, the upper diameter—of the pressure-stage adapter device by means of a form-closed, force-closed and/or substance-closed connection.

In another advantageous configuration of the disclosure, there may be provision that the base piece closes off the working chamber and is supported at the end of the outer cylinder remote from the piston rod.

In another advantageous configuration of the disclosure, there may be provision that a seal (not represented) has been arranged between the pressure-stage adapter device and the inner cylinder.

In another advantageous configuration of the disclosure, there may be provision that the intermediate pipe has been configured as a cylindrical intermediate pipe, in particular without widenings/constrictions.

In another advantageous configuration of the disclosure, there may be provision that the vibration-damper has been equipped with a further damping-valve device, the intermediate pipe being equipped with a mantel for coupling the further damping-valve device.

In another advantageous configuration of the disclosure, there may be provision that an upper separating unit has been arranged between the intermediate pipe and the inner cylinder, the upper separating unit including, in particular, two welded-on supporting rings with an O-ring arranged in between them.

In another advantageous configuration of the disclosure, there may be provision that the upper separating unit has been arranged on the side of the intermediate pipe, or of the inner cylinder, facing away from the pressure-stage adapter device.

The following reference symbols are used in the illustrations:

1 outer cylinder
2 intermediate pipe
3 inner cylinder
4 piston rod
5 piston
6 (first) damping-valve device
7 (second) damping-valve device
8 inner-pipe through-bore
9 flange
10 base piece
12 seal/sealing ring
13 seal/sealing ring
14 valve for pressure-stop damping
15 working chamber on the piston-rod side
16 working chamber remote from the piston rod
17 annular compensating space
18 pressure-stop damping element
19 connecting pin
20 mantel
21 upper separating unit
11' pressure-stage adapter device
111 coupling
112 coupling
211 supporting ring
212 O-ring Features and details that have been described in connection with a method also hold true, of course, in connection with the device according to the disclosure, and conversely, so that, with respect to the disclosure relating to the individual aspects of the disclosure, reference is always made—or can always be made—reciprocally. In addition, a method according to the disclosure, described where appropriate, can be carried out with the device according to the disclosure.

The terminology used herein serves only for the purpose of describing certain embodiments and is not intended to restrict the disclosure. As used herein, the singular forms "a/an" and "the" are intended also to include the plural forms, to the extent that the context does not clearly reveal this to be otherwise. In addition, it will be clear that the terms "exhibits" and/or "exhibiting", when used in this description, specify the presence of the stated features, integers, steps, operations, elements and/or components but do not exclude the presence or the addition of one or more other features, integers, steps, operations, elements, components and/or groups of the same. As used herein, the term "and/or" includes any and all combinations of one or more of the associated listed elements.

Reference will firstly be made to FIG. 1.

A vibration-damper configured in exemplary manner comprises substantially, in particular, an outer cylinder, an intermediate pipe, an inner cylinder, a piston rod with a piston, a damper-valve device, a damper-valve device, an inner-pipe through-bore, a flange, a base piece, a pressure-stage adapter, a seal between the pressure-stage adapter1 and the inner cylinder, and also a seal between the inner cylinder and the intermediate pipe. Furthermore, the vibration-damper may have been equipped with a valve for pressure-stop damping, cf. FIG. 1 in particular. The seals have preferentially been configured as sealing rings.

In the case of the vibration-damper according to FIG. 1, it is, in particular, a question of a vibration-damper with, on average, adjustable damping force. The vibration-damper is equipped in exemplary manner with two separately adjustable damping-valve devices, which, in this exemplary embodiment, have been coupled to working chambers in the inner cylinder for a working movement in each instance. The inner cylinder is subdivided by the piston on the axially movable piston rod into the piston-rod-side working chamber and the working chamber remote from the piston rod, both of which have been completely filled with damping medium. At the ends, the base piece and a piston-rod guide (not represented) close off the two working chambers, respectively. The base piece is attached to the end of the inner cylinder, in particular on the side of the working chamber remote from the piston rod.

The damping medium that is displaced in the course of a movement of the piston rod is taken up by an annular compensating space between the inner cylinder and the outer cylinder. The compensating space is filled via the downstream side of the two damping-valve devices and. A return flow out of the compensating space into the working chamber6 remote from the piston rod takes place via the base piece.

The two damping-valve devices and are arranged outside the outer cylinder and connected to the outer cylinder via a welded-on pipe socket.

The second damping-valve device, is subjected to incident flow via the intermediate pipe, which encases the inner cylinder in sections and therefore constitutes a fluid connection, and is coupled to the piston-rod-side working chamber via a fluid coupling (not represented) in the wall of the inner cylinder. Depending on the supply of current to a coil within the damping-valve device, the damping force is changed.

The first damping-valve device is connected to the working chamber remote from the piston rod via a flow connection, the flow connection being constituted by the pressure-stage adapter which at the end is open to the working chamber remote from the piston rod and therefore also constitutes an integral part of this working chamber. The pressure-stage adapter constitutes a component that is separate from the inner cylinder, and exhibits an inner-pipe through-bore leading to a flange of the damping-valve device.

The resulting mode of operation and further details are sufficiently well-known to a person skilled in the art. In addition, reference may be made to the relevant statements in DE 10 2017 222 232 A1.

In the following, reference will be made to FIGS. 2 to 3.

In accordance with the disclosure, there is provision that the components represented by a pressure-stage adapter and a base piece 10 as well as, a seal 12 of the pressure-stage adapter, a seal 13 leading to an intermediate pipe 2 and/or the component features represented by an inner-pipe perforation 8, have been combined in a pressure-stage adapter device 11'. This compact unit has been realized in such a way that all the desired functions are integrated. By virtue of the distinctly simplified design, the installation effort and the installation risk are reduced by several process steps.

There is provision, in particular, that the base piece 10 closes off working chamber 16 and is supported at the end of the outer cylinder 1 remote from the piston rod.

The seal 13 between the inner cylinder 3 and the intermediate pipe 2 is accordingly omitted in the embodiment according to the disclosure being proposed here.

A seal may be arranged between the pressure-stage adapter device 11' and the inner cylinder 3. The pressure-stage adapter device 11' has been directly connected to the first damping-valve device 6, such that an inner-pipe perforation of an inner cylinder can likewise be omitted.

The pressure-stage adapter device 11' exhibits, in principle, a fluidic coupling 111 facing toward the working chamber remote from the piston rod, as well as a coupling 112 provided for the fluidic coupling of the damping-valve device 6. Couplings 111 and 112 are in fluidic communication.

Figure 2:
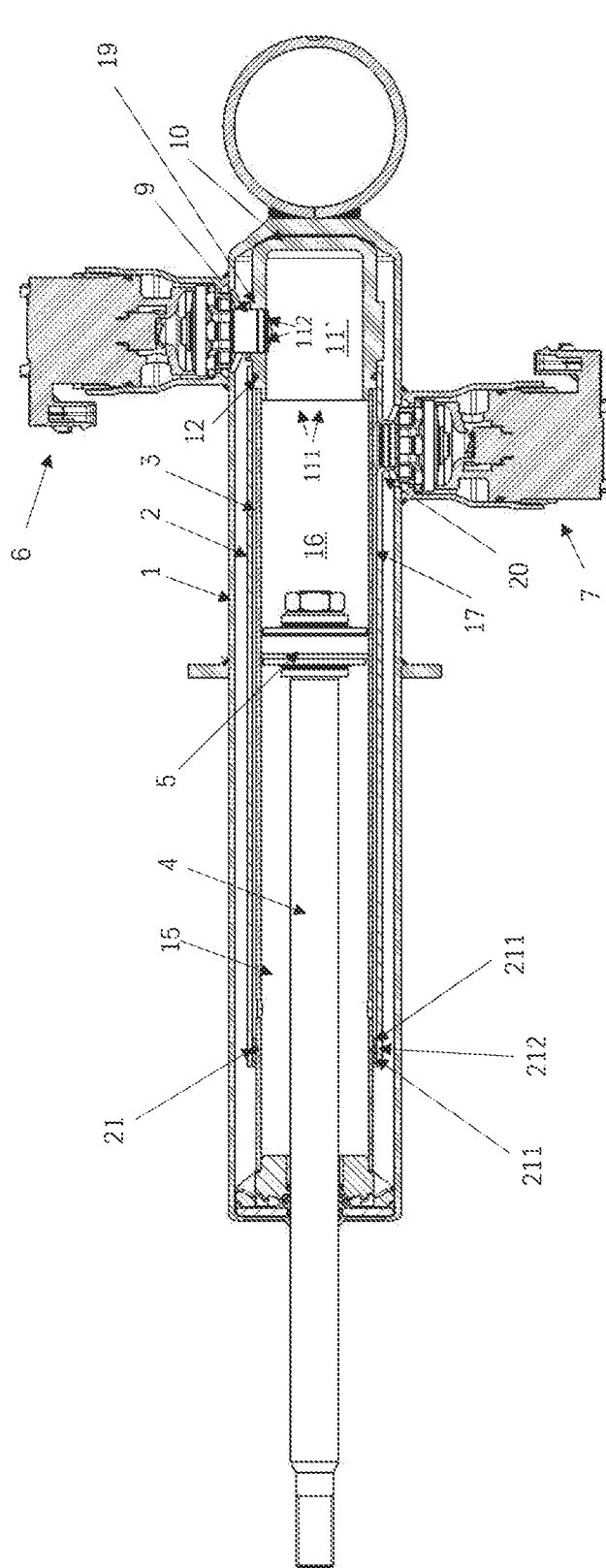
FIG. 2 shows a vibration-damper according to the disclosure in a sectioned view.

In this regard, reference may be made in exemplary manner to the embodiment of a vibration-damper according to the disclosure as shown in FIGS. 2 and 2a.

In the following, reference will be made, in particular, to FIG. 3.

Moreover, an additional pressure-stop damping element 18 with a valve 14 for pressure-stop damping can also be integrated into the pressure damping adapter device 11'.

The pressure-stop damping element 18, or the integrated valve for pressure-stop damping, may have been attached— for instance, clamped or screw-coupled—in the pressure-stage adapter device 11' or, to be more exact, to the upper diameter of the pressure-stage adapter device 11'. A clamp fit between the inner pipe, or housing, and the pressure-stage adapter is also conceivable.

In detail, the disclosure is preferably distinguished by the following advantages/features:

- one-piece design and avoidance of sealing-points and installation processes
- combination with the lower base piece in closed design or as a valve
- integration of the receptacles for inner pipes of several different diameters
- inclusion and integration of the seal for the centre pipe
- optional inclusion of an additional pressure-stop damping, in particular pressure-stage/end-position damping, including separation of the volume flow for normal operation and end-position damping A preferred field of application of the vibration-damper is in a motor vehicle, particularly in the running gear of a motor vehicle.

The pressure-stage adapter device 11' includes a connecting pin 19 for accommodating the flange 9 of the damping-valve device 6.

The pressure-stop damping element 18 has been attached—in particular, has been clamped or screw-coupled—to the diameter—in particular, the upper diameter—of the pressure-stage adapter device 11' by a form-closed, force-closed and/or substance-closed connection.

The base piece 10 closes off working chamber 16 and is supported at the end of the outer cylinder 1 remote from the piston rod.

A seal (not represented) has been arranged between the pressure-stage adapter device 11' and the inner cylinder 3.

The intermediate pipe 2 has been configured to be purely cylindrical without widenings/constrictions, and/or exhibits a mantel 20. The mantel 20 preferably constitutes the coupling for the second damping-valve device 7.

An upper separating unit 21 of the intermediate pipe 2 leading to the inner cylinder 3 has been provided. The upper separating unit 21 may include two welded-on supporting rings 211 with an O-ring 212 arranged in between them. The upper separating unit 21 serves substantially for fixing and/or sealing the inner cylinder 3 in the intermediate pipe 2. There is preferentially provision that the upper separating unit 21 has been arranged on the side of the intermediate pipe 2, or of the inner cylinder 3, facing away from the pressure-stage adapter device 11'.

What is claimed is:

1. A vibration-damper with adjustable damping force, comprising:

an inner cylinder with at least one working chamber including a flow connection to a damper-valve device, wherein the damper-valve device is arranged outside of an outer cylinder of the vibration damper, wherein the flow connection is defined by a component that is separate from the inner cylinder, wherein the component is defined by a pressure-stage adapter which defines a part of the working chamber and which exhibits a coupling to the damper-valve device, and wherein a base piece is arranged at the end of the inner cylinder such that the base piece closes off the working chamber at the end of the inner cylinder, wherein the pressure-stage adapter and the base piece are combined to form a pressure-stage adapter device;

wherein the pressure-stage adapter device is arranged inside and is surrounded and enclosed by the outer cylinder of the vibration damper at the end of the inner cylinder, such that the base piece is supported at an end of the outer cylinder remote from the piston rod.

2. The vibration-damper of claim 1, wherein the pressure-stage adapter device includes a seal.

3. The vibration-damper of claim 2, wherein an intermediate pipe encases the inner cylinder in sections, and the seal being arranged between the pressure-stage adapter and the intermediate pipe.

4. The vibration-damper of claim 1, wherein the inner cylinder does not exhibit an inner-pipe through-bore for coupling the first damper-valve device.

5. The vibration-damper of claim 1, further comprising a pressure-stop damping element within the pressure-stage adapter device.

6. The vibration-damper of claim 1, wherein the pressure-stage adapter device includes a connecting pin for accommodating a flange of the damper-valve device.

7. The vibration-damper of claim 5, wherein the pressure-stop damping element is attached to the pressure-stage adapter device by a form-closed, force-closed, or substance-closed connection.

8. The vibration-damper of claim 1, wherein a seal is arranged between the pressure-stage adapter device and the inner cylinder.

9. The vibration-damper of claim 1, wherein the intermediate pipe is configured as a cylindrical intermediate pipe, in particular is configured without widenings/constrictions.

10. The vibration-damper of claim 1, wherein the intermediate pipe includes a mantel for coupling the damper-valve device.

11. The vibration-damper of claim 3, further comprising an upper separating unit arranged between the intermediate pipe and the inner cylinder, the upper separating unit including two welded-on supporting rings with an O-ring arranged in between them.

12. The vibration-damper of claim 11, wherein the upper separating unit is arranged on a side of the intermediate pipe, or of the inner cylinder, facing away from the pressure-stage adapter device.

\* \* \* \* \*